No. 762,968. PATENTED JUNE 21, 1904.
C. W. WHETSTONE.
CULTIVATOR FENDER.
APPLICATION FILED MAR. 24, 1904.
NO MODEL.

WITNESSES:
C. H. Walker.
M. A. Schmidt

INVENTOR
Cyrenius W. Whetstone
BY
Milo B. Stevens & Co.
Attorneys

No. 762,968. Patented June 21, 1904.

UNITED STATES PATENT OFFICE.

CYRENIUS W. WHETSTONE, OF ALLIANCE, NEBRASKA.

CULTIVATOR-FENDER.

SPECIFICATION forming part of Letters Patent No. 762,968, dated June 21, 1904.

Application filed March 24, 1904. Serial No. 199,687. (No model.)

*To all whom it may concern:*

Be it known that I, CYRENIUS W. WHETSTONE, a citizen of the United States, residing at Alliance, in the county of Boxbutte and State of Nebraska, have invented new and useful Improvements in Cultivator-Fenders, of which the following is a specification.

My invention relates to fenders for cultivators, and has for its object to provide a shield adjustable on the fender for regulating the amount of soil to be thrown on the plants.

The invention consists in certain novel features of construction hereinafter described and claimed, reference being had to the accompanying drawings, in which—

Figure 1:
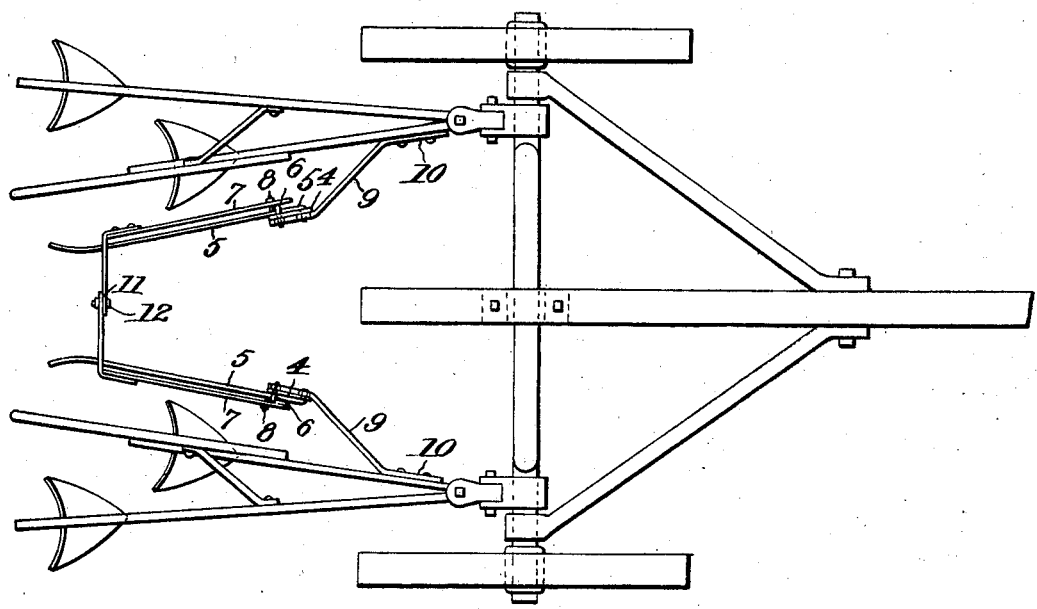
Figure 2:
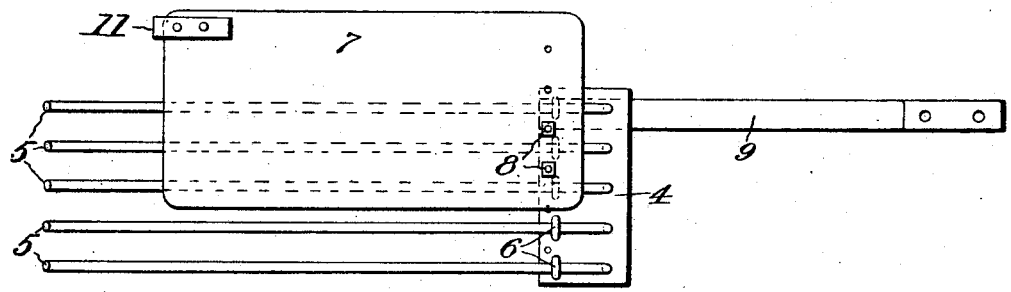

Figure 1 is a plan view of a cultivator provided with the fender. Fig. 2 is a side elevation of the fender detached.

Referring specifically to the drawings, the fender comprises a supporting-plate 4, to which the fender-rods 5 are attached by eyes 6. The fender-rods extend rearwardly from the supporting-plate, and near their outer ends they curve outwardly, as shown in Fig. 1. The shield for regulating the amount of soil to be thrown on the plants comprises a sheet-iron plate 7, which is secured to the supporting-plate 4 by bolts 8 and extends rearwardly over the fender-rods. The plate 4 has a number of bolt-holes, so that the shield can be vertically adjusted thereon, whereby a greater or less number of fender-rods are covered or uncovered. The shield is substantially of the same height as the plate 4, so that all the fender-rods can be covered when it is desired to prevent all soil from reaching the plants.

The fender is attached to the cultivator by a strap 9, which is fastened at one end to the plate 4, in front thereof, the other end of the strap being bolted to the cultivator-beam, as at 10.

The fender is readily attached to any ordinary cultivator, and by its use much smaller corn can be cultivated than by the ordinary method. The fender-rods will effectually prevent all clods, roots, &c., from being thrown on the plants, and by adjusting the shield up or down over the rods the amount of soil intended to pass between the rods is regulated.

In the drawings a straddle-row cultivator is shown carrying two fenders, one on each side of the machine, as indicated in Fig. 1, whereby both sides of the plants are protected. When two fenders are used, as shown, they may be coupled by straps 11, extending from the rear ends of the shield and fastened together at 12.

Having thus described my invention, what is claimed as new, and desired to be secured by Letters Patent, is—

The combination with a straddle-row cultivator, of a fender on each side thereof, said fenders comprising a supporting-plate carrying rearwardly - extending and outwardly-curved fender-rods, a shield adjustable vertically over the fender-rods, and straps extending from the rear ends of the shields and fastened together for coupling the fenders.

In testimony whereof I have signed my name to this specification in the presence of two subscribing witnesses.

CYRENIUS W. WHETSTONE.

Witnesses:
S. M. SMYSER,
JAMES KEELER.